(12) United States Patent
Brown et al.

(10) Patent No.: US 6,386,244 B2
(45) Date of Patent: May 14, 2002

(54) FUEL TANK VALVE APPARATUS

(75) Inventors: Gregory Philip Brown; Brian Allen Engle, both of Connersville, IN (US)

(73) Assignee: Stant Manufacturing, Inc., Connersville, IN (US)

( * ) Notice: Subject to any disclaimer, the term of this patent is extended or adjusted under 35 U.S.C. 154(b) by 0 days.

(21) Appl. No.: 09/728,256

(22) Filed: Dec. 1, 2000

Related U.S. Application Data

(60) Provisional application No. 60/191,658, filed on Mar. 23, 2000, and provisional application No. 60/168,875, filed on Dec. 3, 1999.

(51) Int. Cl.⁷ .............................. B65B 1/04; B65B 3/04
(52) U.S. Cl. .............................. 141/1; 141/4; 141/348; 220/86.2
(58) Field of Search .................... 141/4–8, 59, 44–46, 141/67, 285, 325, 326, 348, 198, 1; 220/86.2

(56) References Cited

U.S. PATENT DOCUMENTS

| | | |
|---|---|---|
| 3,866,638 A | 2/1975 | Mingus et al. .............. 141/352 |
| 3,911,977 A | 10/1975 | Berger ........................ 141/348 |
| 4,881,578 A | 11/1989 | Rich et al. .................... 141/44 |
| 4,883,103 A | 11/1989 | Szlaga et al. ............... 141/368 |
| 4,977,936 A | 12/1990 | Thompson et al. ......... 141/312 |
| 5,271,438 A | 12/1993 | Griffin et al. ................ 141/59 |
| 5,291,924 A * | 3/1994 | Sausner et al. ............. 141/312 |
| 5,568,828 A * | 10/1996 | Harris ........................ 141/348 |
| 5,730,194 A | 3/1998 | Foltz ........................... 141/301 |
| 6,056,029 A | 5/2000 | Devall et al. ............... 141/383 |

* cited by examiner

*Primary Examiner*—Timothy L. Maust
(74) *Attorney, Agent, or Firm*—Barnes & Thornburg

(57) ABSTRACT

A fuel tank valve apparatus for use with a fuel tank. The fuel tank apparatus has an inlet neck defining a valve chamber, a valve housing positioned in the valve chamber, a valve positioned to move within the valve housing to regulate flow of liquid fuel into the fuel tank, and a retainer. The inlet neck is attachable to the fuel tank. The valve housing is retained in the inlet neck for communicating with the fuel tank. Connecting the inlet neck to the fuel tank maintains the integrity of the tank and inlet neck material.

6 Claims, 5 Drawing Sheets

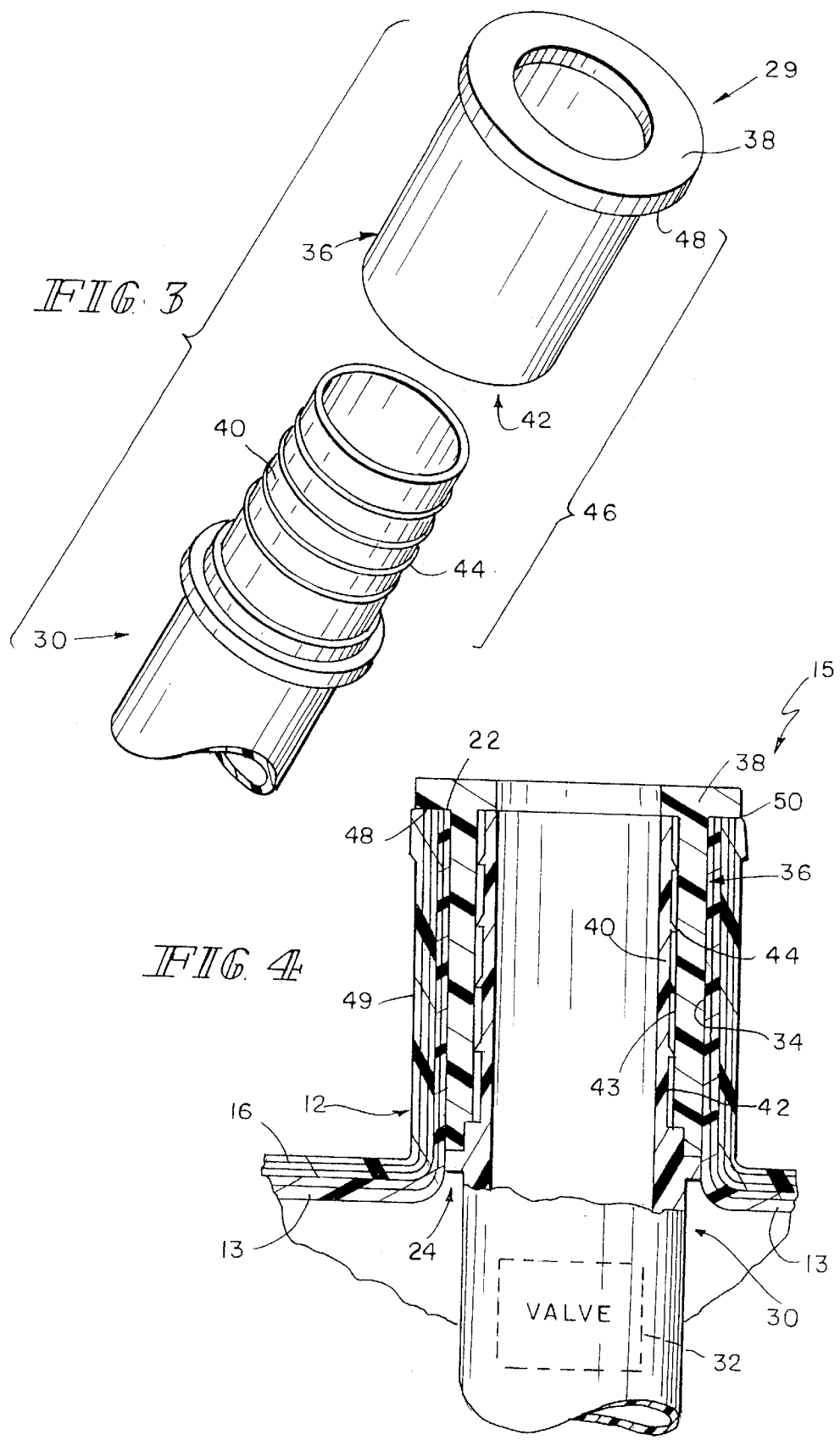

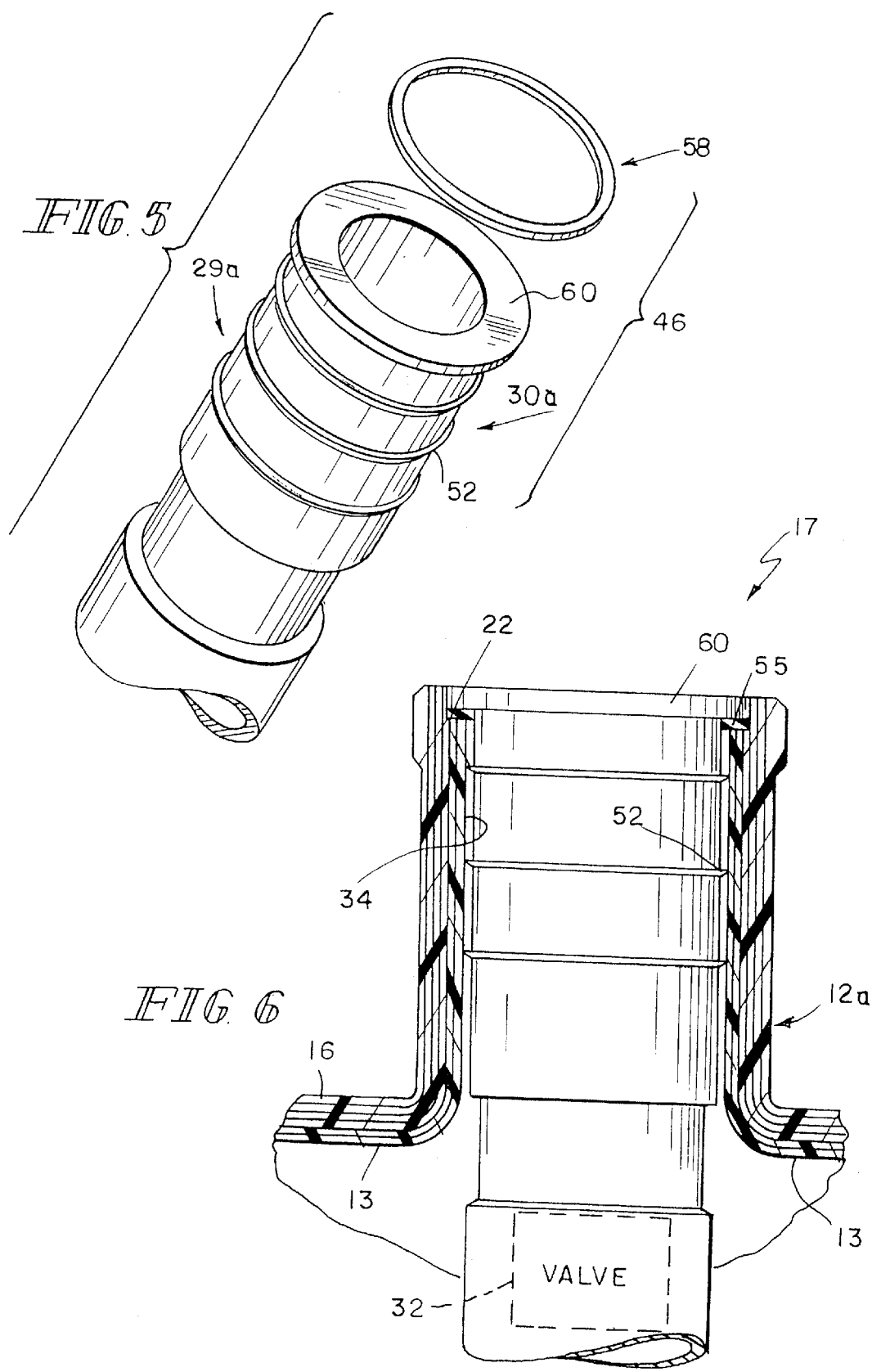

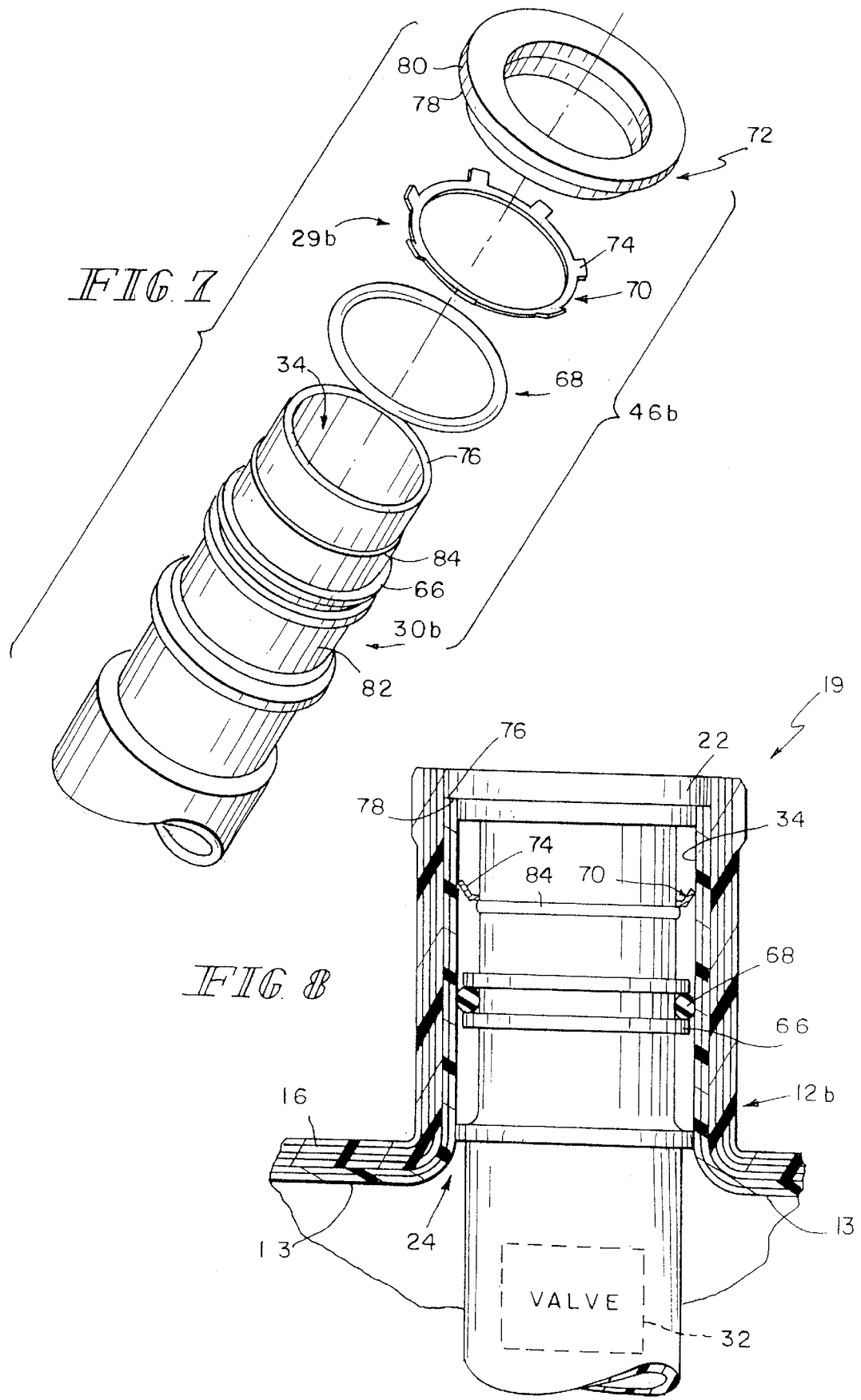

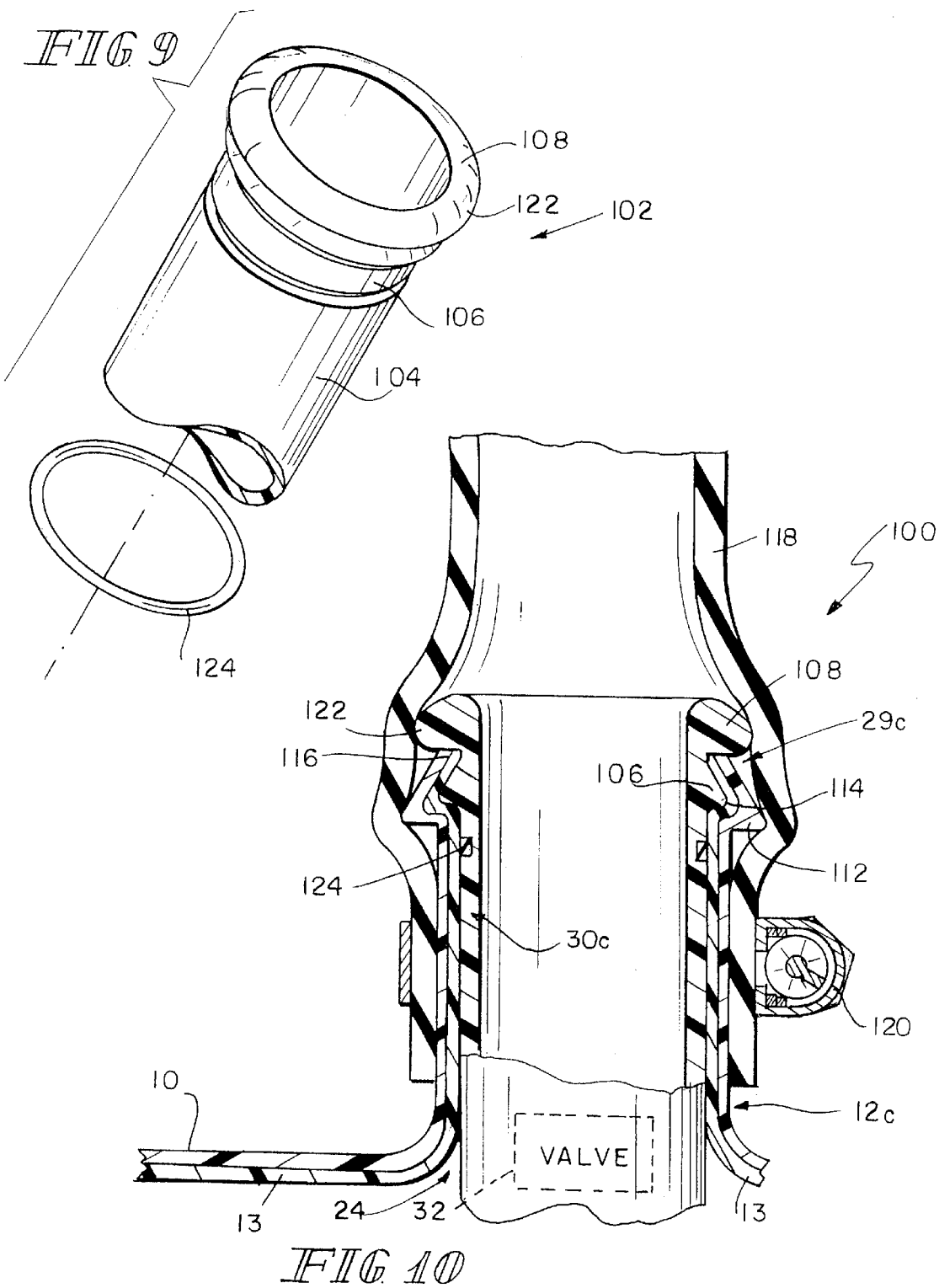

FUEL TANK VALVE APPARATUS

CROSS-REFERENCE

This application claims priority under 35 U.S.C. 119(e) to U.S. Provisional Application Ser. No. 60/168,875 filed Dec. 3, 1999 and U.S. Provisional Application Ser. No. 60/191,658, filed Mar. 23, 2000, both of which are expressly incorporated herein by reference.

BACKGROUND AND SUMMARY OF THE INVENTION

The present invention relates to a fuel system, and particularly to a fuel tank within the fuel system. More particularly, this invention relates to an inlet check valve and a method of installing such a valve within an inlet neck of the fuel tank.

In an automobile fuel system, a fuel tank is typically filled via a filler neck into which a fuel-dispensing nozzle is inserted. The fuel tank may be molded to include an inlet neck which is connected to the filler neck by way of a jumper hose. The molded tank is formed of a suitable plastic material. It is desirable to include an inlet check valve within the inlet neck of the fuel tank to prevent liquid fuel from escaping back up through the inlet neck and jumper hose to the filler neck. See, for example, U.S. Pat. No. 5,568,828. In the interest of containing fuel vapor and hydrocarbons, such molded tanks may be constructed with a permeation or penetration barrier to prevent hydrocarbons from the fuel from escaping to the atmosphere through the tank material.

Typically, a valve is placed in the inlet neck at the time of assembly of the fuel storage system including the fuel tank. At the time the fuel tank is installed in the automobile, the jumper hose is installed to connect the fuel tank to the filler neck. In this way, the valve placed within the inlet neck is prevented from backing out of the inlet neck by the connection of the jumper hose to the inlet neck of the fuel tank.

According to the present invention, a fuel tank valve apparatus includes a fuel tank having an inlet neck defining a valve chamber, a valve housing positioned in the valve chamber, a valve positioned to move within the valve housing to regulate flow of liquid fuel into the fuel tank, and a retainer. The retainer serves to couple the valve housing to the inlet neck for retaining the valve housing in the inlet neck and maintaining the integrity of the tank and inlet neck material.

In preferred embodiments, the retainer comprises a collar having a flange weldable to an annular rim of the inlet neck. The collar is connected to the valve housing to create an insert cartridge. An insert cartridge is formed by inserting a shaft of the valve housing into the collar before the collar has completely cured subsequent to being molded. In this way, the collar cools and cures around the shaft of the valve housing forming a secure connection there between to create the insert cartridge. The insert cartridge is then placed within a valve chamber of the inlet neck and secured therein by welding the weldable flange of the collar to the annular rim of the inlet neck.

Additional features and advantages of the invention will become apparent to those skilled in the art upon consideration of the following detailed description and preferred embodiments exemplifying the best mode of carrying out the invention as presently perceived.

BRIEF DESCRIPTION OF THE DRAWINGS

The detailed description particularly refers to the accompanying figures in which:

FIG. 3 is an exploded perspective view of a valve housing and a retaining collar prior to being mounted in a fuel tank inlet neck as shown in FIG. 4;

FIG. 4 is a sectional view, with portions cut away, of the valve housing and retaining collar of FIG. 3 inserted within the inlet neck of FIG. 2 to illustrate a first embodiment of a fuel tank valve apparatus in accordance with the present invention;

FIG. 5 is an exploded perspective view of a valve housing and sealing ring prior to being mounted in a fuel tank inlet neck as shown in FIG. 6, the valve housing having a series of retaining barbs coupled to it;

FIG. 6 is a sectional view, with portions cut away, of the valve housing and sealing ring of FIG. 5 retained within the inlet neck of the fuel tank by way of the barbs of FIG. 5 to illustrate a second embodiment of a fuel tank valve apparatus in accordance with the present invention;

FIG. 7 is an exploded perspective view of a valve housing, an O-ring, a toothed washer, and a sealing cap prior to being mounted in a fuel tank inlet neck as shown in FIG. 8;

FIG. 8 is a sectional view, with portions cut away, of the valve housing and O-ring of FIG. 7 retained within the inlet neck of the fuel tank by the toothed washer of FIG. 7 to illustrate a third embodiment of a fuel tank valve apparatus in accordance with the present invention;

FIG. 9 is an exploded perspective view of a valve housing molded to include a sealing lip and a retaining barb prior to being mounted in a fuel tank inlet as shown in FIG. 10 and an O-ring; and FIG. 10 is a sectional view with portions cut away of the valve housing molded to include a sealing lip of FIG. 9 inserted within a filler neck which is molded to include a hose-retaining barb to illustrate a fourth embodiment of a fuel tank valve apparatus in accordance with the present invention.

DETAILED DESCRIPTION OF THE DRAWINGS

Figure 1:
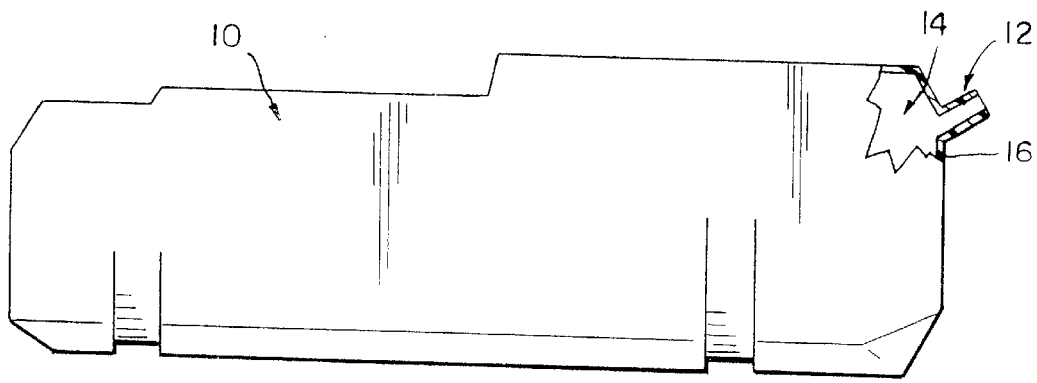
FIG. 1 is a side elevation view, with portions cut away, of a vehicle fuel tank showing an inlet neck integrally molded to the exterior wall of the fuel tank.
Figure 2:
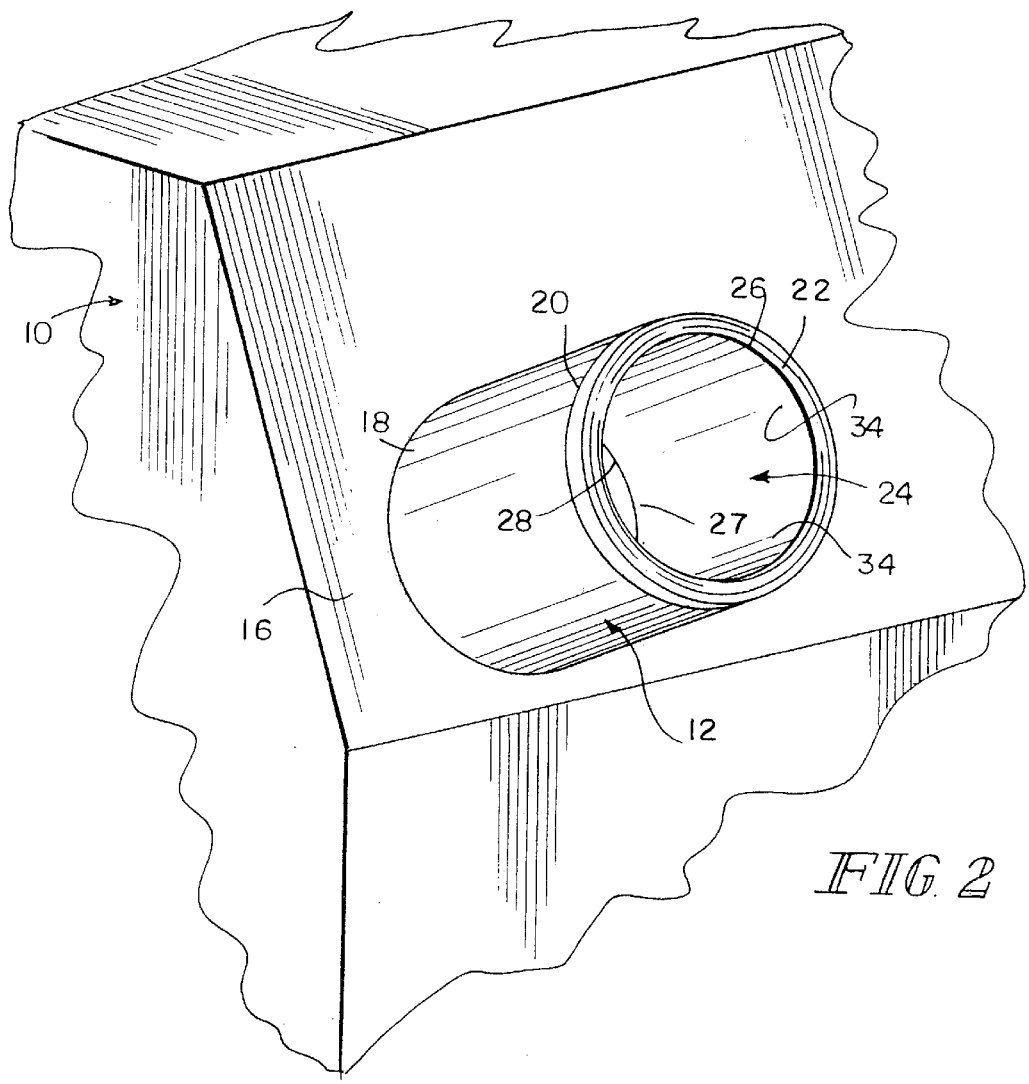
FIG. 2 is a magnified perspective view of the inlet neck of FIG. 1, the inlet neck having an inner end, an outer end, and an annular rim.

As shown in FIG. 1, a fuel tank 10 includes an outer wall 16 which defines an interior fuel storage region 14. Fuel tank 10 may be molded to include an inlet neck 12. In this case, inlet neck 12 is typically molded as an integral part of fuel tank 10. Referring back to FIG. 1, the entire fuel tank 10, including inlet neck 12, may be constructed, using known techniques, of a multi-layer plastic material which prevents permeation of liquid and vapor fuel there through. As such, a permeation or penetration barrier 13 layer of material may be provided. Barrier 13 prevents hydrocarbons from the fuel from escaping through the walls of the tank. Barrier 13 may be positioned along an inside surface, an outside surface or sandwiched between inner and outer layers of the tank 10. As shown in FIG. 2, inlet neck 12 has an inner end 18 which abuts outer wall 16 and an outer end 20. Inlet neck 12 further includes an outer annular rim 22 defining an inlet opening 26 and an inner annular rim 27 defining an outlet opening 28. An inner wall 34 of the inlet neck 12 defines a valve chamber 24 therein.

Various embodiments of a fuel tank valve apparatus in accordance with the present invention are shown in FIGS. 4, 6, 8, and 10. In the various embodiments like elements use the same reference numbers or variations of the same reference number using an alphabetic suffix. In each case, a retainer 29 serves to couple a valve housing 30 within inlet neck 12 with a value 32 retained within the valve housing 30. Further, each embodiment couples valve housing 30 to tank 10 without breaching or cutting through barrier 13 and thus maintaining a continuous uninterrupted barrier against hydrocarbon emissions. By maintaining the integrity of barrier 13 the possibility of hydrocarbon escape is further reduced.

In the first embodiment, as illustrated in FIGS. 3 and 4, the retainer 29a is in the form of at least on and preferably a plurality retaining collar 36 which surrounds a shaft 40 of the valve housing 30 and includes a weldable flange 38 suitable for welding to an annular rim 22 of the inlet neck 12.

In a second embodiment, as illustrated in FIGS. 5 and 6, the retainer 29a is in the form of retaining barbs 52 which are coupled directly to the valve housing 30a and prevent the valve housing 30a from backing out of the inlet neck 12a once the valve housing 30a is installed within the inlet neck 12a.

In a third embodiment, as illustrated in FIGS. 7 and 8, the retainer 29b is in the form of a toothed washer 70 which abuts against a circumferential rib 84 coupled to the valve housing 30b. The toothed washer 70 includes teeth 74 which engage or dig into the interior wall 34 of the inlet neck 12b to prevent the valve housing 30b from disengaging or backing out of the inlet neck 12b once the valve housing 30b is installed within the inlet neck 12b.

In a fourth embodiment, as illustrated in FIGS. 9 and 10, the retainer 29c is in the form of a retaining barb 106 molded as part of the valve housing 30c which fits within cooperatively formed recess 114 in the inlet neck 12c to prevent the valve housing 30c from disengaging or backing out of the inlet neck 12c once the inlet neck 12c cools and conforms around the valve housing 30c.

As shown in FIGS. 3 and 4, fuel tank valve apparatus 15 includes a retaining collar 36 having a weld flange 38. As shown in FIG. 3, a valve housing 30 includes a shaft 40 having one or more ribs 44 thereon. The shaft 40 is inserted within a shaft-receiving chamber 42 of collar 36. Ribbed shaft 40 is sized to tightly fit within shaft receiving chamber 42 of collar 36. Collar 36 will typically be constructed of HDPE plastic or some other material suitable for welding to fuel tank 10. HDPE plastic, or other suitable materials for welding to fuel tank 10, are typically shaped through a molding process. After molding collar 36 out of HDPE plastic, and before it has time to completely cure, ribbed shaft 40 of valve housing 30 is forced into shaft-receiving chamber 42 of collar 36. In this way, collar 36 cools, cures, and forms around ribbed shaft 40 so that ribs 44 of ribbed shaft 40 engage an internal surface 43 of collar 36 to hold the collar 36 in engagement with valve housing 30. It is within the scope of this disclosure that other methods such as overmolding of collar 36 on ribbed shaft 40 may be used to couple collar 36 to valve housing 30.

After valve housing 30 and collar 36 have been coupled as described above, a resulting valve assembly insert cartridge 46 is positioned into or dropped down into valve chamber 24 of inlet neck 12. With cartridge 46 inserted into valve chamber 24, a bottom surface 48 of weld flange 38 abuts annular rim 22 of inlet neck 12. Once inserted, cartridge 46 is secured to inlet neck 12 by a weld 50 between bottom surface 48 and annular rim 22 of inlet neck 12. In this way, inlet check valve 32, included within valve housing 30 is secured within inlet neck 12 of fuel tank 10 via retainer collar 36. A typical inlet check valve is disclosed in U.S. Pat. No. 6,056,029 issued May 2, 2000 and assigned to the assignee of the present invention, the disclosure of which is incorporated herein by reference. Weld 50 serves as a positive connection between valve housing 30 and inlet neck 12 and seals all of the layers, including barrier 13 layer, of the tank material. Weld 50 is then further sealed when a jumper hose (not shown) is later engaged or clamped over an external surface 49 of inlet neck 12 during insertion of fuel tank 10 into an automobile (not shown).

Another fuel tank valve apparatus 17 in accordance with the present invention is shown in FIGS. 5 and 6. As shown in FIG. 5, the retainer 29a in the form of one or more outwardly extending projections illustrated as a series of retaining barbs 52 are coupled to a valve housing 30a to form an insert cartridge 46a. The barbs 52 may be in the form of discrete barbs or annular rings which provide the necessary engagement with the inside surface of the neck 12a. An outside dimension 53 of the projections 52 being greater than an interior dimension 55 of the inlet neck 12a to create an interference fit. In this embodiment, valve housing 30a, itself, includes a flange 60. Insert cartridge 56 is inserted into valve chamber 24 of inlet neck 12a and is retained therein by retaining barbs 52. Retaining barbs 52 dig into inner wall 34 of inlet neck 12a, thereby preventing insert cartridge 46a from being backed out of inlet neck 12a. With insert cartridge 46a inserted into inlet neck 12a, flange 60 limits the inward range of travel of the cartridge 46a into the valve chamber 24 and prevents liquid fuel within interior fuel storage region 14 of fuel tank 10 from escaping between valve housing 30a and inner wall 34, past retaining barbs 52, and out of inlet neck 12a. However, additional sealing may be achieved by the inclusion of a sealing ring 58 between flange 60 and annular rim 22.

Yet another fuel tank valve apparatus 19 in accordance with the present invention is shown in FIGS. 7 and 8. As shown in FIG. 7, a valve housing 30b includes a shaft 82 having a plurality of spacers 66 and a washer rib 84. To secure valve housing 30b within inlet neck 12, the retainer 29b in the form of a toothed washer 70 used. Toothed washer 70 is positioned or slipped over shaft 82 and abuts washer rib 84. Then, a sealing cap 72 is welded to an annular edge 76 to form an insert cartridge 64 and capturing toothed washer 70 between washer rib 84 and sealing cap 72.

An entire insert cartridge 46b is then inserted within valve chamber 24 of inlet neck 12 until a bottom surface 78 of a cap flange 80 abuts annular rim 72 of inlet neck 12b. This prevents valve housing 30b from slipping out of valve chamber 24 and down the interior fuel storage region 14. Teeth 74 of toothed washer 70 are canted upward toward an inlet opening 26 of inlet neck 12b so that they "slide" along inner wall 34 without "catching." However, any one or more of teeth 74 of toothed washer 70 dig into inner wall 34 of inlet neck 12b, and serve to retain valve housing 30b within valve chamber 24 of inlet neck 12, out of inlet neck 12 if it is attempted to back valve housing 30b. In this way, valve housing 30b is held within valve chamber 24 through the cooperation of both toothed washer 70 and cap flange 80. Sealing cap 72 further serves to provide a physical barrier to prevent fuel from escaping out of interior fuel storage region 14 and through inlet neck 12b. However, additional sealing may be achieved by the inclusion of an O-ring 68 positioned by sequential spacers 66 between valve housing 30b and inner wall 34 of inlet neck 12b.

Still another fuel tank apparatus 100 in accordance with the present invention is shown in FIGS. 9 and 10. As shown in FIG. 9, a valve housing 30c includes a shaft 104 molded to integrally include a retainer 29c in the form of a retaining barb 106 and a sealing lip 108. As shown in FIG. 10, an inlet neck 12c is formed as an integral part of fuel tank 10 and is molded to include a hose-retaining barb 112. When tank 10 is blow molded to include hose-retaining barb 112 as part of inlet neck 12c, a recess 114 is necessarily formed opposite hose-retaining barb 112.

Valve housing 30c is secured within inlet neck 12c by inserting valve housing 30c within inlet neck 12c before inlet neck 12c has completely cooled and cured after molding. In this way, inlet neck 12c cools and shrinks around shaft 104 of valve housing 30c and retaining barb 106 is captured within recess 114 to secure valve housing 30c within inlet neck 12c. The interface between retaining barb 106 and recess 114 provides secure engagement while maintaining the unbroken integrity of continuous barrier layer 13. With valve housing 30c thus secured within inlet neck 12c, sealing lip 108 completely covers and overlaps an end 116 of inlet neck 12c. Once valve housing 30c is secured within inlet neck 12c, a jumper hose 118 is slipped over sealing lip 108 of valve housing 30c and inlet neck 12c, and clamped in place using a hose clamp 120. With this configuration, an outer circumferential edge 122 of sealing lip 108 contacts jumper hose 118 to form a fuel and hydrocarbon impermeable seal there between. At the same time, hose-retaining barb 112 provides retention and a secondary seal along with hose clamp 120 to prevent jumper hose 118 from slipping off of inlet neck 12c and fuel and hydrocarbons from leaking from the assembly. It should be noted that the present disclosure is not intended to be limited to the specific size and proportional relationship between sealing lip 108 and barb 112 as shown FIG. 10. Rather, sealing lip 108 may have a diameter which is larger, smaller or equal to the diameter of barb 112.

It will be understood to one of ordinary skill in the art that inlet neck 12c may be molded to omit hose-retaining barb 112 and molded with generally straight walls so that both the hose-retention and fuel-sealing functions are achieved by sealing lip 108 of valve housing 30c. Valve housing 30c is typically constructed of a material which is fuel and hydrocarbon impenetrable or impermeable. The outer layer of a multi-layer fuel tank, such as fuel tank 10, is typically constructed of HDPE and while it is fuel impermeable, it is generally not hydrocarbon impenetrable and does not alone stop hydrocarbon emissions from penetrating or permeating the material. Therefore, sealing lip 108 of valve housing 30c overlaps end 116 of inlet neck 12c and direct contacts jumper hose 118 to provide a fuel-impenetrable seal. It will be readily understood to one of ordinary skill in the art that such a fuel and hydrocarbon impenetrable sealing lip formed as an integral part of a valve housing may be utilized in any one of the earlier referenced embodiments suggested by FIGS. 1–8.

In each embodiment described above, an inlet check valve 32 is positively secured within the inlet neck 12 (generally) of the fuel tank 10 prior to a jumper hose being connected to the inlet neck at the time the fuel tank is installed within an automobile. As discussed above, the embodiments also show that retainer 29 (generally) engages the inlet neck without breaking permeability barrier 13. Further, in FIGS. 1–8, the inlet check valve is included within the overall fuel delivery system with the only possible point of fuel leakage or interruption of permeation barrier 13 located at the inlet opening of the inlet neck—a location which is, at any rate, enveloped by the jumper hose clamped over the inlet neck to provide a connection between the inlet neck and the filler neck at the time the fuel tank is installed within the vehicle.

In addition, as depicted in the embodiments shown in FIGS. 9, and 10, a sealing lip or barb which overlaps the inlet opening of the inlet neck may be utilized, so that even the inlet opening (while nevertheless enveloped by the jumper hose) does not create a possible point of fuel leakage.

Present invention also includes the method of installing valve housing 30 (generally) in said inlet neck 12 (generally). With reference to the figures, the valve housing is provided with a retainer to couple the valve housing with the inlet neck. The valve housing is provided with the valve 32 retained therein. The retainer 29 (generally) is formed on or attached to the valve housing as shown in the illustrations and described hereinabove. The valve housing is then inserted into the valve chamber of the inlet neck with the retainer engaging the inlet neck, without breaching barrier 13, so as to position the valve 32 retained within the housing 30 (generally) in communication with the tank and maintain the integrity of barrier 13.

Although the invention has been described in detail with reference to certain preferred embodiments, variations and modifications exist within the scope and spirit of the invention as described and defined in the following claims.

What is claimed is:

1. A fuel tank valve apparatus comprising:
   a fuel tank including a wall and an inlet neck extending from said wall, said inlet neck having an inner end appended to said wall and an outer end arranged to define a rim, said inlet neck defining a valve chamber having an inlet opening defined by said rim and an outlet opening communicating with the interior volume of said fuel tank;
   a valve housing positioned at least partially in said valve chamber;
   a valve positioned in said valve housing to regulate flow of liquid fuel into said fuel tank through a filler neck coupled to said inlet neck;
   a retainer coupled to said valve housing and arranged to engage said inlet neck to retain said valve housing in a fixed position in said valve chamber so that said valve housing is fixed to said fuel tank; and
   said retainer includes a plurality of barbs extending from an outer surface of said valve housing and arranged to engage an inner wall of said inlet neck.

2. A fuel tank valve apparatus comprising:
   a fuel tank including a wall and an inlet neck extending from said wall, said inlet neck having an inner end appended to said wall and an outer end arranged to define a rim, said inlet neck defining a valve chamber having an inlet opening defined by said rim and an outlet opening communicating with the interior volume of said fuel tank;
   a valve housing positioned at least partially in said valve chamber;
   a valve positioned in said valve housing to regulate flow of liquid fuel into said fuel tank through a filler neck coupled to said inlet neck;
   a retainer coupled to said valve housing and arranged to engage said inlet neck to retain said valve housing in a fixed position in said valve chamber so that said valve housing is fixed to said fuel tank; and
   said retainer includes a toothed washer positioned to lie between said valve housing and an inner wall of said inlet neck.

3. A fuel tank valve apparatus comprising:
   a fuel tank including a wall and an inlet neck extending from said wall, said inlet neck having an inner end appended to said wall and an outer end arranged to define a rim, said inlet neck defining a valve chamber having an inlet opening defined by said rim and an outlet opening communicating with the interior volume of said fuel tank;

a valve housing positioned at least partially in said valve chamber;

a valve positioned in said valve housing to regulate flow of liquid fuel into said fuel tank through a filler neck coupled to said inlet neck;

a retainer coupled to said valve housing and arranged to engage said inlet neck to retain said valve housing in a fixed position in said valve chamber so that said valve housing is fixed to said fuel tank; and said retainer includes at least one outwardly extending projection with said inlet neck being overmolded over said outwardly extending projection.

4. A fuel tank valve apparatus for installation into an inlet neck of a fuel tank, said inlet neck defining a valve chamber having an inlet opening defined by an open end of said inlet neck, said fuel tank valve apparatus comprising:

a valve housing formed for at least partially being disposed in said valve chamber;

a valve retained in communication with said valve housing;

a retainer for coupling said valve housing with said inlet neck to retain said valve housing in a fixed position in said valve chamber to position said valve relative to said fuel tank; and said retainer includes a toothed washer positioned to lie between said valve housing and an inner wall of said inlet neck.

5. A fuel tank valve apparatus for installation into an inlet neck of a fuel tank, said inlet neck defining a valve chamber having an inlet opening defined by an open end of said inlet neck, said fuel tank valve apparatus comprising:

a valve housing formed for at least partially being disposed in said valve chamber;

a valve retained in communication with said valve housing;

a retainer for coupling said valve housing with said inlet neck to retain said valve housing in a fixed position in said valve chamber to position said valve relative to said fuel tank; and said retainer includes at least one outwardly extending projections with said inlet neck being overmolded over said outwardly extending projection.

6. A method of installing a fuel tank apparatus on an inlet neck of a fuel tank, said fuel tank including a hydrocarbon impermeable barrier layer, said fuel tank apparatus including a valve housing positioned at least partially in a valve chamber defined by said inlet neck, a valve positioned in said valve housing, and a retainer coupled to said valve housing for engaging said inlet neck to retain said valve housing in said chamber without interrupting said hydrocarbon impermeable barrier layer of said tank, said method including the steps of:

forming said valve housing;

positioning said valve in said valve housing;

providing a retaining collar engageable with said valve housing for defining a valve assembly; and attaching a portion of said retaining collar to said inlet neck for retaining said valve assembly in communication with said inlet neck retainer collar without interrupting said hydrocarbon impermeable barrier layer of said tank, to position said valve in communication with said fuel tank.

* * * * *